UNITED STATES PATENT OFFICE.

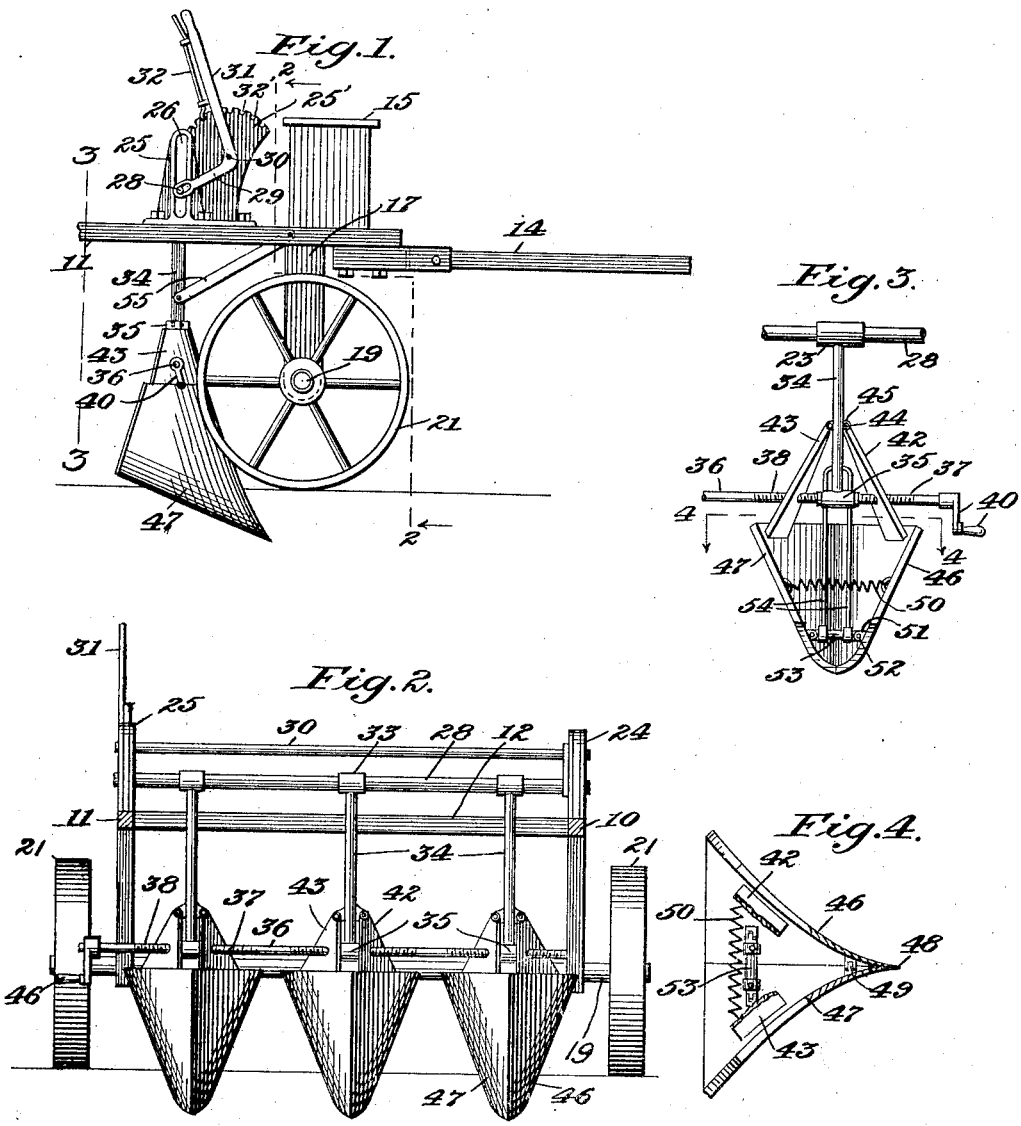

NICK HOYNACK, OF CALEDONIA, ONTARIO, CANADA.

AGRICULTURAL IMPLEMENT.

1,343,564.  Specification of Letters Patent.  Patented June 15, 1920.

Application filed March 4, 1919. Serial No. 280,523.

*To all whom it may concern:*

Be it known that I, NICK HOYNACK, a subject of the King of England, residing at Caledonia, Province of Ontario, and Dominion of Canada, have invented certain new and useful Improvements in Agricultural Implements, of which the following is a specification.

This invention relates to improvements in agricultural implements and particularly to seed planters.

The principal object of the invention is to provide an apparatus which may be drawn by any convenient means, as a team of draft animals, and which will prepare the soil by furrowing, deliver seeds thereto and cover the seeds in such manner that several rows can be properly seeded simultaneously.

A further object is to provide means whereby the width of the furrows opened in the soil may be adjusted according to the seed it is desired to plant.

A still further object is to provide means of control for the width of the furrows, the depth they are made, the actuation of the feeding device and of the covering means. All of which are conveniently operated from the upper part of the apparatus.

These and other like objects are attained by the novel construction and combination of parts hereinafter described and shown in the accompanying drawings, forming a material part of this disclosure, and in which—

Figure 1 is a side elevational view showing an implement made in accordance with the invention.

Fig. 2 is a vertical sectional view taken on line 2—2 of Fig. 1.

Fig. 3 is a fragmentary sectional view taken on line 3—3 of Fig. 1, and

Fig. 4 is a horizontal sectional view taken on line 4—4 of Fig. 3.

The implement is shown to be comprised of a substantial rectangular open frame having side elements 10 and 11 arranged longitudinally the same being rigidly connected at the rear by a bar 12, and at the front by a similar bar (not shown). Below the frame, at the front end, is the usual tongue 14 to which draft animals can be attached while upon the platform at the front end of the apparatus is a raised seat 15 for the operator.

The frame is mounted upon supports 17, in which is journaled shaft 19 having fixed upon its ends the wheels 21.

Mounted upon the side frames 10 and 11, near the front of the apparatus, are raised brackets 24 and 25, the same containing vertical slots 26, in which are operatively engaged a bar 28, connected within slotted openings in the arm of a lever 29, pivoted on the bracket by a spindle 30, and provided with an extended operating handle 31, with which is engaged a detent 32, its lower end being suited to enter the recesses 33, formed in a segmental extension 25′ of the bracket 25.

Engaged at spaced intervals on the bar 28, are connections 33, from which extend vertical bars 31 supporting other connections 34, through which pass a rod 36 provided with alternate right and left screw threads 37 and 38, the rod extending outward laterally from the frame and terminating in an operating crank handle 40, which upon being rotated transmits rotary motion to the rod the screw headed portions of which engage with plates 42 and 43, connected at their upper ends by pivots 44, set in lugs 45 which are slidable on the connecting bars 34, while the lower ends of the plates 42 and 43, are secured to the inner side of the shovel elements 46 and 47 which constitute the plow or furrow opening devices.

These opening elements contact at their converging points 48, rearward of which are connections 49 permitting them to separate limitedly and in order to hold the opening elements normally closed together there is engaged between them coiled tension springs 50, the elements being further engaged by internal lugs 51, carrying pivots 52, connecting with cross bars 53, with which are engaged springs 54, supported by the bar 34.

Having thus described my invention what I claim as new and desire to secure by Letters Patent, is—

1. A plow share of the character described, comprising a handle, extension plates slidably engaging said handle at opposite sides thereof, movable shovel elements against the inner walls of which said handle elements bear with their lower ends, means for normally holding said shovel elements closed and means for separating said shovel elements.

2. A plow share of the character described, comprising a handle, extension plates pivotally secured to lugs sliding along said handle at opposite sides thereof, movable shovel elements against the inner walls of which said handle elements bear with their lower ends, means for normally holding said shovel elements closed, a rod passing transversely to said plates and extension, and provided with a left and right hand thread on opposite sides of said extension and a crank handle on said rod.

3. An agricultural implement comprising a pair of coöperating shovel elements, means for flexibly connecting said elements to each other near their forward edges, means for spreading said elements apart, a bar for supporting said elements in operative position, a plate connecting said bar with each of said shovel elements, and means for normally maintaining said shovel elements in closed position.

4. An agricultural implement comprising a pair of coöperating shovel elements, means for flexibly connecting said elements to each other near their forward edges, means for spreading said elements apart, a bar for supporting said elements in operative position, a plate connecting said bar with each of said shovel elements, a cross bar flexibly connected with each of said shovel elements near their rear edges, and connections between said cross bar and said supporting bar.

5. An agricultural implement comprising a pair of coöperating shovel elements, means for flexibly connecting said elements to each other near their forward edges, means for spreading said elements apart, a bar for supporting said elements in operative position, a plate connecting said bar with each of said shovel elements, a cross bar flexibly connected with each of said shovel elements near their rear edges, and yielding connections between said cross bar and said supporting bar.

6. An agricultural implement comprising a plurality of shovel elements arranged in pairs, means for connecting the elements of each pair to each other near their forward edges, means for supporting the elements in pairs, and means for simultaneously spreading apart both elements of all pairs of elements.

7. An agricultural implement comprising a plurality of shovel elements arranged in pairs, means for connecting the elements of each pair of elements to each other near their forward edges, means for supporting the elements in pairs, means for simultaneously spreading apart both elements of all pairs of elements, and means for maintaining all said elements in such spread relation.

8. An agriculturel implement comprising a plurality of shovel elements arranged in pairs, a supporting bar for each of said pairs of shovel elements, a bar to which all of said supporting bars are connected, means for raising and lowering said last named bar, and means for simultaneously spreading apart both elements of all pairs of elements.

9. An agricultural implement comprising a plurality of shovel elements arranged in pairs, means connecting the elements of each pair of elements to each other near their forward edges, a supporting bar for each pair of elements, a bar to which all of said supporting bars are connected, means for raising and lowering said last named bar, means for securing the same in various adjusted positions, and means for maintaining all the aforesaid elements in spread relation.

10. An agricultural implement comprising a plurality of shovel elements arranged in pairs, a supporting bar for each of said pairs, a plate flexibly connecting each element of each pair with its supporting bar, a bar to which all of said supporting bars are connected, and a rod extending through all of said plates and provided with reversely threaded portions adapted to engage said plates simultaneously and thus simultaneously spread apart the shovel elements of all pairs of elements.

11. An agricultural implement comprising a pair of shovel elements, a supporting bar therefor, a plate connecting each element to said bar, and a rod extending through said plates and provided with reversely threaded sections to simultaneously engage said plates and force them in opposite directions, to spread their shovel elements.

In testimony whereof I have affixed my signature.

NICK HOYNACK.

Witness:
HARRISON ARRELL.